United States Patent [19]

Birschl

[11] Patent Number: 5,457,892

[45] Date of Patent: Oct. 17, 1995

[54] GAUGE FOR FORMING DIE KEEPER PIN ASSEMBLIES

[75] Inventor: Peter Birschl, Brunswick, Ohio

[73] Assignee: Chrysler Corporation, Highland Park, Mich.

[21] Appl. No.: 301,760

[22] Filed: Sep. 7, 1994

[51] Int. Cl.⁶ .............................. G01B 3/22; B23Q 17/22
[52] U.S. Cl. .................. 33/655; 33/627; 33/710; 33/542; 72/482
[58] Field of Search .................. 33/542, 544.3, 33/544.5, 545, 627, 628, 645, 655, 710, 833, 836; 72/482

[56] References Cited

U.S. PATENT DOCUMENTS

| | | | |
|---|---|---|---|
| 2,208,476 | 7/1940 | Selander | 33/542 |
| 4,200,987 | 5/1980 | Schmitt | 33/542 |
| 4,265,026 | 5/1981 | Meyer | 33/542 |
| 4,314,406 | 2/1982 | Barnes | 33/542 |

Primary Examiner—William A. Cuchlinski, Jr.
Assistant Examiner—G. Bradley Bennett
Attorney, Agent, or Firm—Christopher A. Taravella

[57] ABSTRACT

A gauge for determining pertinent dimensions to which portions of die keeper pin assemblies are to be machined prior to insertion of the latter into a stamping die assembly. The gauge includes a body having a partial circular extension formed on one end thereof, a rod having one threaded end freely mounted through an axial passageway and threadedly connected to threads formed at the end thereof, a hole formed in the non-circular portion of the extension, a spring-loaded pin slip-fitted in the hole adapted to being secured in any axial position by threading the rod into engagement with the pin. The gauge is inserted through a passage formed through a wall of a stamping die body so as to position the pin in the path of a movable die pad, while the rod is out of contact with the pin. After the pad is caused to travel to its lowest position, urging the pin inwardly, the rod is threadedly extended into engagement with the pin to hold its depressed position. Thereafter, a keeper pin assembly is machined to conform to the height dimension established by the secured, gauge pin and inserted through the die passage to serve as a safety stop for the die pad.

8 Claims, 3 Drawing Sheets

GAUGE FOR FORMING DIE KEEPER PIN ASSEMBLIES

TECHNICAL FIELD

This invention relates generally to stamping dies and, more particularly, to a gauge used in the formation of keeper pin assemblies for use on such dies to serve as safety stops during production use of the dies.

BACKGROUND ART

It is customary in the stamping die field to have holes formed through each side of a die structure, e.g., four or more, adapted to having so-called, flat nose keeper pin assemblies slip fitted therethrough, with flat-nosed ends extending into the die cavity. The ends serve, during production cycles, as stops for a downwardly travelling die pad which holds the part to be formed. Heretofor, such keeper pin assemblies, formed close to their finished shape, were blued with a known shop use bluing paint, inserted through the holes formed in the sides of the die, the pad then lowered thereagainst, the pins removed and hand ground to eliminate high spots. This process was repeated until all four or more keeper pin assembly end extensions were as flat and as equally planar as possible, after which production cycles could begin. As such, the process was extremely time consuming and, hence, very costly for labor and lost production time.

DISCLOSURE OF THE INVENTION

A general object of the invention is to provide an improved method and apparatus for shaping the pad-engaging ends of flat nose keeper pin assemblies.

Another object of the invention is to provide a gauge which is used in lieu of the keeper pin assemblies themselves to readily and quickly determine the exact dimensions to which a portion of the keeper pin assembly are to be surface ground prior to its assembly into the die.

A further object of the invention is to provide a gauge which simulates a flat nose keeper pin assembly of a particular diameter, and includes a spring-loaded small diameter pin mounted in a hole formed in a flat surface, and an associated threaded rod adapted to engage the spring-loaded pin in each of its inoperative and operative positions.

Still another object of the invention is to provide a method for checking the operative position of a die pad, and thereby providing a dimension to which a production keeper pin assembly is surface ground prior to its installation into a die.

These and other object and advantages will become more apparent when reference is made to the following drawings and the accompanying description.

BEST MODE OF CARRYING OUT THE INVENTION

Figure 1:
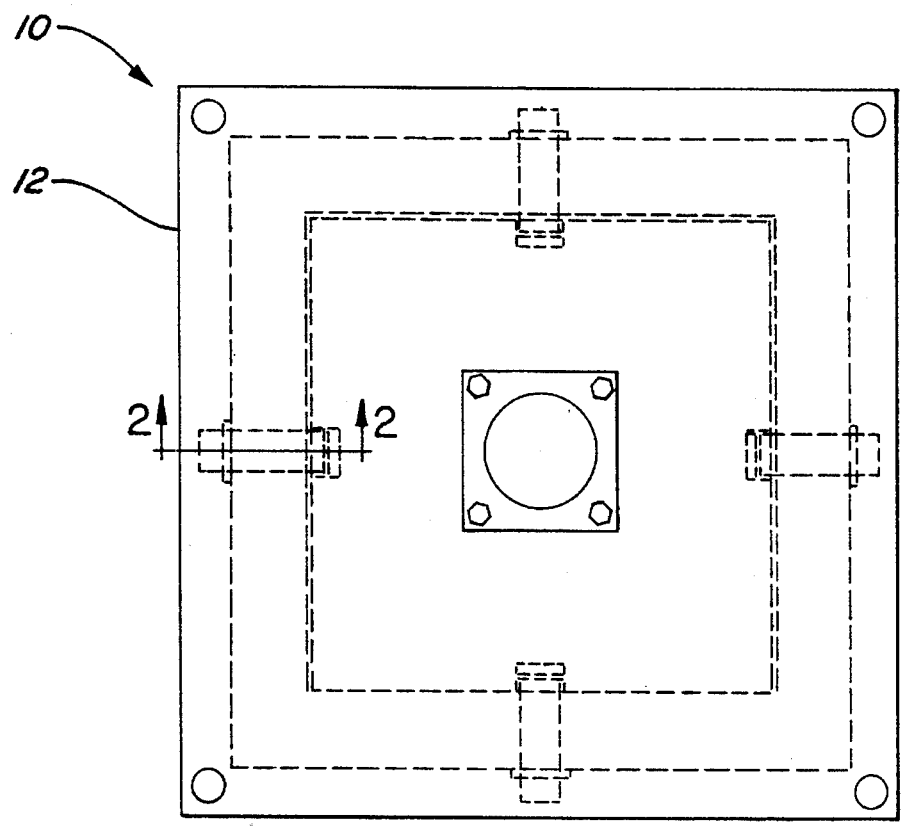
FIG. 1 is a fragmentary cross-sectional view of a stamping die and pad assembly having a plurality of flat nose type keeper pin assemblies mounted therein.
Figure 2:
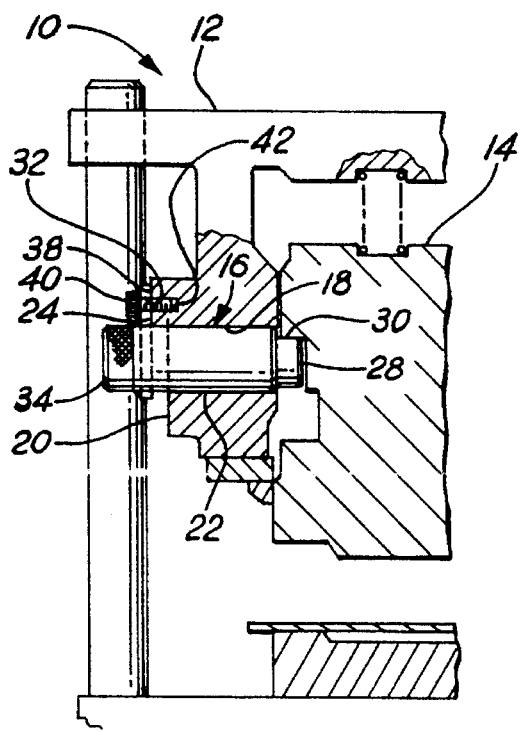
FIG. 2 is a cross-sectional view taken along the plane of the line 2—2 of FIG. 1, and looking in the direction of the arrows, with the pad in its operative down position.
Figure 3:
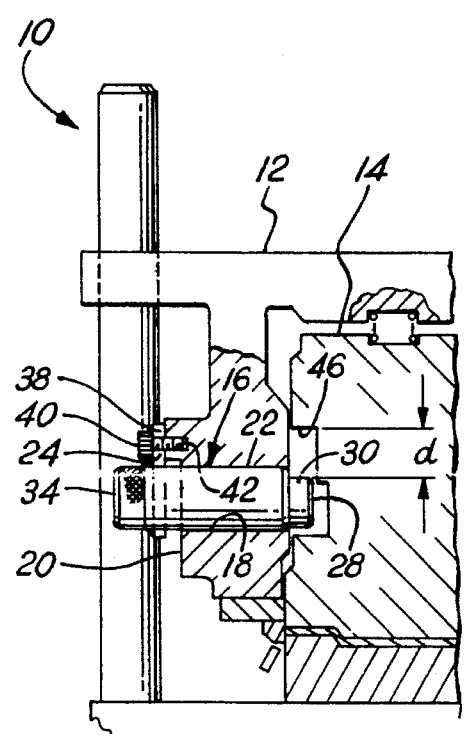
FIG. 3 is a view similar to the FIG. 3 structure, with the pad in its inoperative up position.

Referring now to the drawings in greater detail, FIGS. 1–3 illustrate a stamping die assembly 10 including a die body 12 having a die pad 14 (FIGS. 2 and 3) slidably mounted therein. A keeper pin assembly 16 is slip-fitted into a hole 18 formed through a side wall 20 of the body 12 to a predetermined depth.

Figure 7:
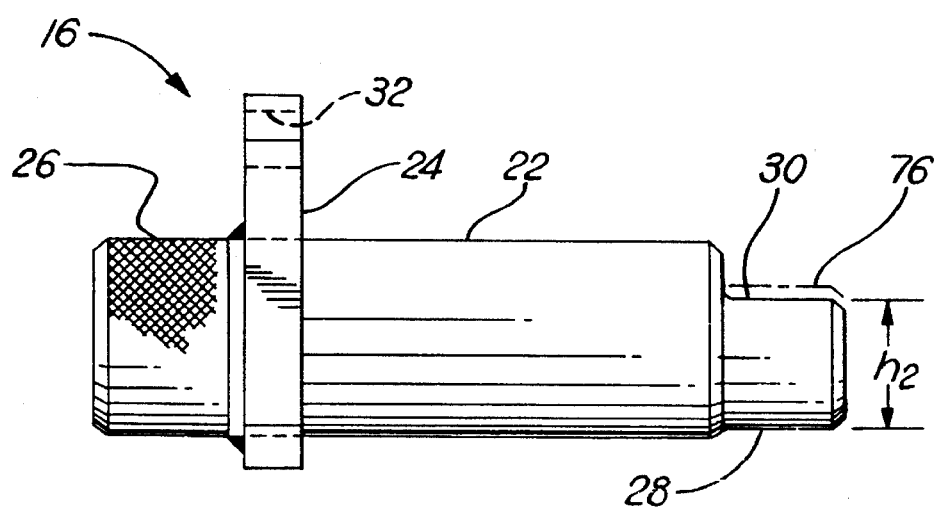
FIG. 7 is an enlarged side elevational view of the keeper pin portion of the FIGS. 1–3 structure.

As shown in FIG. 7, the keeper pin assembly 16 includes a body 22 of a predetermined diameter having a flange 24 formed on one end portion thereof, a knurled head 26 secured in any suitable manner, such as by welding, to the flange 24, a smaller diameter extension 28 formed on the other end of the body 22, and a flat side 30 formed on the extension 28. A passage 32 is formed through the flange 24.

As shown in FIGS. 2 and 3, when the keeper pin assembly 16 is slip fitted into the hole 18, its position therein is established by the flange 24 abutting against a flat surface 38 formed of the die body 12. A locator pin 40 is inserted through the passage 32 into a hole 42 formed in the flat surface 40 to circumferentially locate the keeper pin body 22 in the hole 18 and, hence, position the flat side 30 of the extension 28 in a horizontal attitude.

Figure 4:
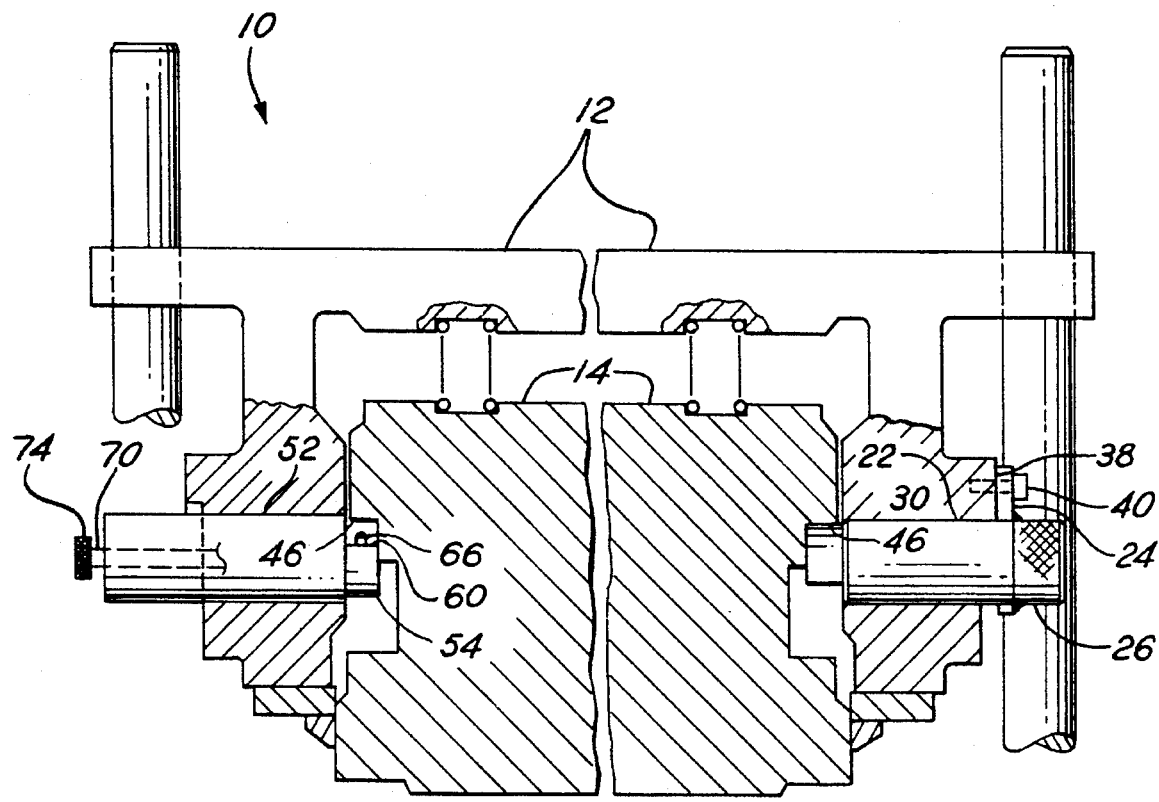
FIG. 4 is a broken cross-sectional view of a stamping die and pad assembly, wherein a gauge is shown mounted on the left and a keeper pin assembly mounted on the right, with the pad in its operative down position.

Once a keeper pin assembly 16 is thus installed in each side wall 20 of the die body 12, e.g., four side walls, the co-planar flat sides 30 serve as safety stops (FIGS. 2 and 4) for the downward travel of the pad 14 which holds the part (not shown) being formed by the stamping operation. Specifically, a horizontal flat surface 46 (FIG. 3) is formed on the pad 14 vertically aligned with the respective flat side 30 of the keeper pin extension 28. The pad 14 is adapted to travel vertically during each stamping cycle through the distance d (FIG. 3) between the surfaces 46 and 30.

As explained above, heretofor each keeper pin assembly 16 was repeatedly blued, inserted through the hole 18, subjected to impact by the flat surface 46 of the pad 14, removed and hand ground until a satisfactory final flat surface 30 was attained.

Figure 6:
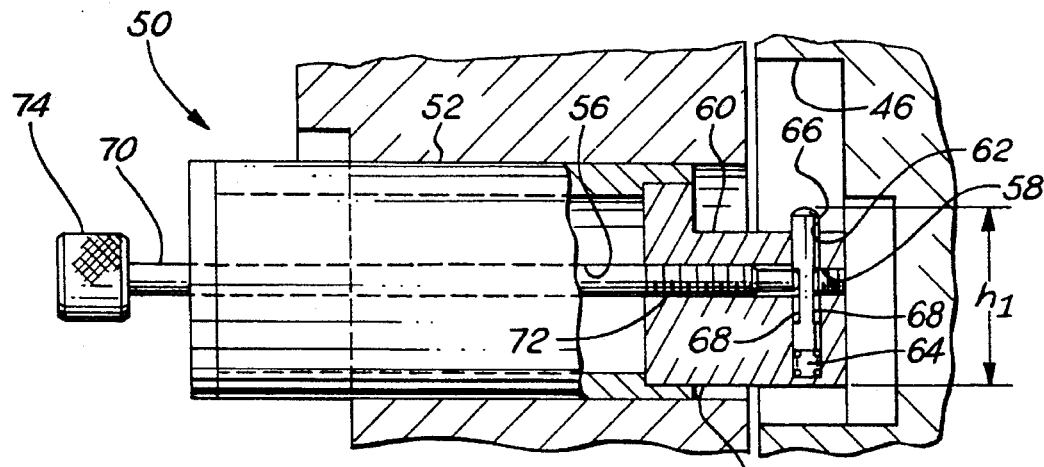
FIG. 6 is a view similar to FIG. 5, with the pin on the gauge retained by a threaded rod, and the pad withdrawn.
Figure 5:
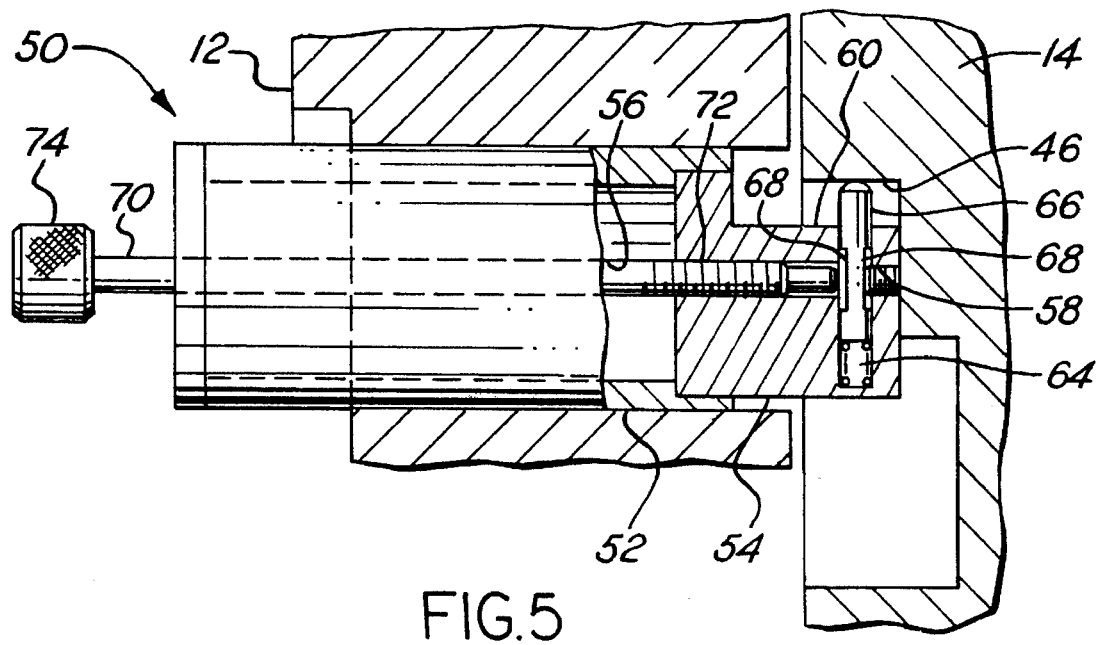
FIG. 5 is an enlarged side elevational view in partial cross-section of a gauge used to determine the operative dimension of the FIG. 2 keeper pin, with the pad lowered against a spring-loaded pin on the gauge.

In keeping with the invention, a gauge 50, shown in FIGS. 5 and 6 has been formed with the same body 52 diameter and extension 54 diameter as for the keeper pin body 22 diameter and extension 28 diameter. An axial passage 56 is formed through the gauge 50, with the end portion 58 of the passage 56 within the extension 28 being threaded. A surface 60, which may be a flat or other selected shape, and lower than the flat surface 30 of the keeper pin 16, is formed on a side of the extension 54. A hole 62 of a predetermined depth is formed in the surface 60 along the longitudinal center line thereof, and crossing through the threaded end portion 58 of the passage 56.

A coil spring 64 is mounted in the bottom of the hole 62 beyond the threaded end portion 58. A pin 66 is slidably mounted in the hole 62, seated on top of the spring 64. Oppositely disposed flat sides 68 of a predetermined length are formed on a center portion of the length of the pin 66, for a purpose to be described.

A rod 70 having a threaded end 72 is slidably extended through the axial passage 56 and threadedly connected in the threaded end portion 58. A head 74 is secured on the exposed end of the rod 70 for manually rotating same.

In operation, the head 74 and rod 70 are first rotated so as to have the threaded end 72 engage either one of the flat sides 68 of the pin 66. The gauge 50 is then inserted through the hole 18 of the die body 12, and the threaded end 72 threadedly backed away from the pin 66. The die pad 14 is lowered to its lowest operative position, with its flat surface 46, engaging the pin 66 and urging it downwardly, compressing the spring 64. While thus engaged, the head 74 and rod 70 are once again rotated to bring the threaded end 72 back into engagement with the adjacent flat side 68 of the now depressed pin 66. The pad 14 is then raised, and the gauge 50 removed from the hole 18. A micrometer is used to measure the distance represented as $h_1$ in FIG. 5. With this dimension $h_1$ known, stock, represented in phantom as 76 in FIG. 8, is then removed by a machining operation, such as by surface grinding, until a dimension, shown as $h_2$ in FIG. 7, is attained, corresponding to the dimension $h_1$ in FIG. 6. Each keeper pin assembly 16 thus finished is now ready to be mounted in one of the holes 18 in the die body 12, ready to serve as a safety stop during the production cycles of the pad 14 within the die body 12.

INDUSTRIAL APPLICABILITY

It should be apparent that the invention provides a gauge which is adapted to be set quickly and positively by a downwardly traveling die pad through its normal stroke. The thus set gauge is then used to accurately machine a contacting surface of a die keeper pin assembly prior to the latter being inserted into the die assembly. This process eliminates the need to hand grind, through trial and error and repeated insertions, the surface of the keeper pin assembly which is to be contacted by the die after assembly to serve as a safety stop during production.

While but one embodiment of the invention has been shown and described, other modifications thereof are possible within the scope of the following claims.

What is claimed is:

1. For use with a stamping die having a body with side openings formed therein, and a pad vertically movable therein through a predetermined stroke, the improvement comprising a gauge inserted through one side opening and including a spring-loaded end portion adapted to be contacted by the pad, and locking means for locking-in the spring-loaded end portion to establish a machining dimension for machining a safety stop surface on a keeper pin assembly conforming to the lower end of the pad's stroke.

2. A gauge comprising a body having a partial circular extension formed on one end thereof, an axial passageway formed through the body and the extension, threads formed in the extension end portion of the passageway, a rod having one threaded end freely mounted through said passageway and threadedly connected to said threads, a hole formed in the non-circular portion of said extension transverse to and crossing said threaded extension end portion, a spring mounted in said hole beyond said threaded extension end portion, a pin slip-fitted in said hole and on said spring adapted to being secured in any axial position by threading said rod into engagement with said pin.

3. The gauge described in claim 2, and a stamping die including a die body and a die pad slidably mounted in the body with a predetermined travel distance, and a passage formed through a wall of said die body, said gauge adapted to be inserted through said passage so as to position said pin in the path of said pad, said rod being out of contact with said pin.

4. The gauge described in claim 3, wherein, after said pad travels to its lowest position, urging said pin inwardly, compressing said spring, said rod is threadedly extended into engagement with said pin.

5. The gauge described in claim 4, and a keeper pin assembly having a body identical to said gauge body, and a partial circular extension the same diameter and same relative location to said body as that of said gauge, with a flat surface formed on said extension across the non-circular part of said extension, said flat surface to be machine cut so as to have a dimension from the flat surface to the furthest point of said partial circular extension of said keeper pin assembly identical to the dimension from the outer end of said pin to the furthest point of said partial circular extension of said gauge.

6. The gauge described in claim 5, wherein said machine cut is performed by surface grinding.

7. For use with a stamping die assembly including a die body, a die pad slidably mounted in the die body for a predetermined vertical travel distance, a plurality of passages formed through walls of the die body, a flat nose keeper pin assembly extended through each passage, the keeper pin assembly having a flat surface positioned at the lower end of said predetermined vertical travel distance to serve as a safety stop for said pad, a method of forming said flat surface comprising the steps of:

a. forming a gauge body the exact dimensions of said keeper pin except for said flat surface;

b. forming a passageway axially through said gauge body;

c. threading said passageway at one end of said passageway;

d. inserting a rod having one threaded end extended through said passageway and threadedly connected to said threaded end;

e. forming a hole in a surface of the gauge body across the passageway;

f. inserting a spring in the hole;

g. inserting a pin in the hole on the spring and across the passageway to complete the gauge assembly;

h. inserting the gauge assembly into one of said plurality of passages, with the pin positioned in the path of the pad;

i. lowering the pad to its lowermost travel position onto the pin, depressing same;

j. tightening the rod against the depressed pin;

k. removing the gauge assembly;

l. machining the flat surface of each keeper pin assembly to conform to the position of the depressed pin; and m. inserting each machined keeper pin assembly into a respective passage.

8. The method described in claim 7, wherein the machining step 1 is performed by surface grinding.

\* \* \* \* \*